(12) United States Patent  (10) Patent No.: US 8,794,607 B2
Sobajima et al.  (45) Date of Patent: Aug. 5, 2014

(54) SUPPORTING DEVICE FOR SUPPORTING AN IN-VEHICLE MOUNTED OBJECT

(75) Inventors: Kohnosuke Sobajima, Toyota (JP);
Yoshihiro Nakagiri, Okazaki (JP);
Toshiyuki Tetsuda, Nisshin (JP);
Hiroshi Shimofukasako, Toyota (JP);
Katsuyuki Furuhata, Kariya (JP);
Nobuhiko Yoshioka, Anjo (JP); Masashi Kodan, Toyota (JP)

(73) Assignees: Toyota Jidosha Kabushiki Kaisha, Toyota (JP); Advics Co., Ltd., Kariya-Shi (JP)

( * ) Notice: Subject to any disclaimer, the term of this patent is extended or adjusted under 35 U.S.C. 154(b) by 1888 days.

(21) Appl. No.: 11/884,755

(22) PCT Filed: Mar. 24, 2006

(86) PCT No.: PCT/JP2006/306793
§ 371 (c)(1),
(2), (4) Date: Aug. 21, 2007

(87) PCT Pub. No.: WO2006/112248
PCT Pub. Date: Oct. 26, 2006

(65) Prior Publication Data
US 2008/0157447 A1    Jul. 3, 2008

(30) Foreign Application Priority Data
Apr. 15, 2005 (JP) .................. 2005-118953

(51) Int. Cl.
*F16F 7/00* (2006.01)

(52) U.S. Cl.
USPC ........ 267/141.1; 267/182; 248/611; 248/614; 248/638

(58) Field of Classification Search
USPC ........ 267/182, 153, 140.5, 140.4, 140.1, 141, 267/141.1; 248/559, 562, 608, 611, 609, 248/613, 614, 638, 560
See application file for complete search history.

(56) References Cited

U.S. PATENT DOCUMENTS

| 6,099,190 A | 8/2000 | Honobe et al. | |
| 2002/0190572 A1* | 12/2002 | Nakazawa | 303/116.4 |
| 2003/0155809 A1 | 8/2003 | Schlitzkus et al. | |

FOREIGN PATENT DOCUMENTS

| DE | 43 24 099 C1 | 7/1994 |
| JP | A 2004-521276 | 7/2004 |
| WO | WO 02/10610 A1 | 2/2002 |

* cited by examiner

*Primary Examiner* — Melanie Torres Williams
(74) *Attorney, Agent, or Firm* — Oliff PLC

(57) ABSTRACT

A supporting device supports an in-vehicle mounted object on a vehicle body. The supporting device includes a bracket and an elastic member. The bracket has a side-plate part having an opening part. The elastic member is engaged with the first opening part so as to be provided between the bracket and the in-vehicle mounted object. The side-plate part includes a notch having one end connected to the opening part and the other end open outward. The notch does not intersect with a plane containing a line passing substantially a center of the opening part and extending in a main vibrating direction of the in-vehicle mounted object, the plane being substantially perpendicular to the side-plate part.

8 Claims, 11 Drawing Sheets

SUPPORTING DEVICE FOR SUPPORTING AN IN-VEHICLE MOUNTED OBJECT

TECHNICAL FIELD

The present invention generally relates to supporting devices and, more particularly, to a supporting device for supporting or mounting an in-vehicle mounted object to a vehicle.

BACKGROUND ART

Conventionally, as a supporting device for supporting or mounting a fluid-pressure unit of a brake apparatus as an example of an object to be mounted to a vehicle (in-vehicle mounted object), there is known one containing a bracket (console) for mounting the fluid-pressure unit via elastic members (for example, refer to Patent Document 1). The bracket contained in the supporting device has tow plate plate-like parts (legs) that are generally perpendicular to each other. One of the two plate-like parts is fixed to a side part of the fluid-pressure unit via two elastic members. The one of the plate-like parts is provided with two notches that open in a direction of mounting the fluid-pressure unit to the bracket (vertical direction) so that the elastic members fixed to the fluid-pressure unit are held in the notches. On the other hand, an elongated hole is formed in the other of the two plate-like parts so that an elastic member, which is attached to a pin extending from a bottom part of the fluid-pressure unit, is inserted into the elongated hole. The bracket for mounting the fluid-pressure unit is fixed to a predetermined position of a vehicle body. By using those elastic materials and the bracket, a transmission of a vibration from the vehicle body to the fluid-pressure unit can be suppressed while reducing a space needed for mounting the fluid-pressure unit.

Patent Document: Japanese Laid-Open Patent Application No. 2004-521276

However, even if the fluid-pressure unit as an in-vehicle device is mounted to the vehicle body by using the above-mentioned supporting device, it is difficult to completely suppress a vibration of the fluid-pressure unit while the vehicle is moving. That is, if the above-mentioned supporting device is used and when the vehicle is moving, especially, on a punishing road, the fluid-pressure unit vibrates to no small extent mainly in a direction indicated by an arrow in FIG. 1, that is, in a vertical direction indicated by the outline arrow in the figure with elastic members C, which are provided to the bottom part of the fluid-pressure unit A, serving as a support point. Hereinafter, the major direction of vibration of such an in-vehicle mounted object is referred to as "main vibrating direction". In the above-mentioned conventional supporting device, since the notches D formed in the bracket B open in the vertical direction in FIG. 1, the elastic members C tend to move in a direction in which the elastic members C are separated from the notches due to the vibration, and, thereby, there may occur a case in which the vibration of the fluid-pressure unit A is further promoted. If the vibration of the fluid-pressure unit is increased, there may occur a noise problem or a stress generated in a brake tube extending from the fluid-pressure unit is increased.

DISCLOSURE OF THE INVENTION

It is a general object of the present invention to provide an improved and useful supporting device in which the above-mentioned problems are eliminated.

A more specific object of the present invention is to provide a supporting device for mounting an in-vehicle mounted object, which can suppress a vibration generated in the object or transmitted to the object effectively by elastically supporting the in-vehicle mounted object.

In order to achieve the above-mentioned objects, there is provided according to the present invention a supporting device for supporting an in-vehicle mounted object on a vehicle body, the supporting device comprising: a bracket having a side-plate part having a first opening part; and a first elastic member engaged with the first opening part so as to be provided between the bracket and the in-vehicle mounted object, wherein the side-plate part includes a first notch having one end connected to the first opening part and the other end open outward; and the first notch does not intersect with a plane containing a line passing substantially a center of the first opening part and extending in a main vibrating direction of the in-vehicle mounted object, the plane being substantially perpendicular to the side-plate part.

According to the supporting device of the present invention, the side-plate part of the bracket is attached to a predetermined position of the in-vehicle mounted object via the elastic member that is engaged with the opening part of the bracket by being inserted through the notch connected to the opening part. When the in-vehicle mounted object, which is supported on the vehicle body by the supporting device, vibrates in the main vibrating direction which is a major direction of vibration of the in-vehicle mounted object, a large force is exerted on the elastic member in the main vibrating direction, and, thereby, the elastic member tends to be moved in the main vibrating direction. In order to prevent such a movement, the bracket contained in the supporting device is provided with the notch in the side-plate part so that the notch does not intersect with the plane that contains the line passing the center point of the opening part and extending in the main vibrating direction and perpendicular to the side-plate part. Accordingly, a portion of the side-plate part of the bracket, which intersects with the above-mentioned plane, is always in contact with the elastic member. Thus, if a large force is applied to the elastic member in the main vibrating direction, the elastic member is prevented from being moved from the opening part to the notch, thereby retaining the elastic member within the opening part. As a result, according to the supporting device of the present invention, the in-vehicle mounted object is elastically supported to suppress transmission of a vibration to the in-vehicle mounted object or a vibration of the object itself without the elastic member being removed from the bracket due to a force applied to the elastic member in the main vibrating direction.

In the supporting device according to the present invention, the bracket may include a bottom-plate part extending from the side-plate part and fixed to a bottom of the in-vehicle mounted object via an elastic member.

In the supporting device according to the present invention, the main vibrating direction may be substantially coincident with the vertical direction.

In the supporting device according to the present invention, the side-plate part may include a first restriction part that restricts a movement of the first elastic member at a position determined according to a direction of a maximum force to be applied to the first elastic member due to a vibration of the in-vehicle mounted object.

In the supporting device according to the present invention, the first notch may extend from a first side of the side-plate part in a direction substantially perpendicular to the main vibrating direction and connected to the first opening part. Alternatively, the first notch may extend from a first side of the side-plate part in a direction oblique to the main vibrating direction and connected to the first opening part.

Additionally, the supporting device according to the present invention may further comprise a second elastic member, and wherein the side-plate part may include a second opening part engaged with the second elastic member and a second notch having one end connected to the second opening part and the other end open outward, and the main vibrating direction is perpendicular to a line passing center points of the first and second opening parts.

In the above-mentioned supporting device, the first notch may extend from a first side of the side-plate part in a direction substantially perpendicular to the main vibrating direction and connected to the first opening part; and the second notch may extend from a second side of the side-plate part opposite to the first side in the direction substantially perpendicular to the main vibrating direction and connected to the second opening part.

In the above-mentioned supporting device, the side-plate part may include a second restriction part that restricts a movement of the second elastic member at a position determined according to a direction of a maximum force to be applied to the second elastic member due to a vibration of the in-vehicle mounted object.

In the above-mentioned supporting device, the first notch may extend from a first side of the side-plate part in a direction oblique to the main vibrating direction and connected to the first opening part; and the second notch may extend from a second side of the side-plate part opposite to the first side in a direction oblique to the main vibrating direction and connected to the second opening part.

In the above-mentioned supporting device, wherein the first and second elastic members may have the same configuration.

Other objects, features and advantages of the present invention will become more apparent from the following detailed description when read in conjunction with the accompanying drawings.

BEST MODE FOR CARRYING OUT THE INVENTION

A description will now be given, with reference to the drawings, of a supporting device according to an embodiment of the present invention.

Figure 2:
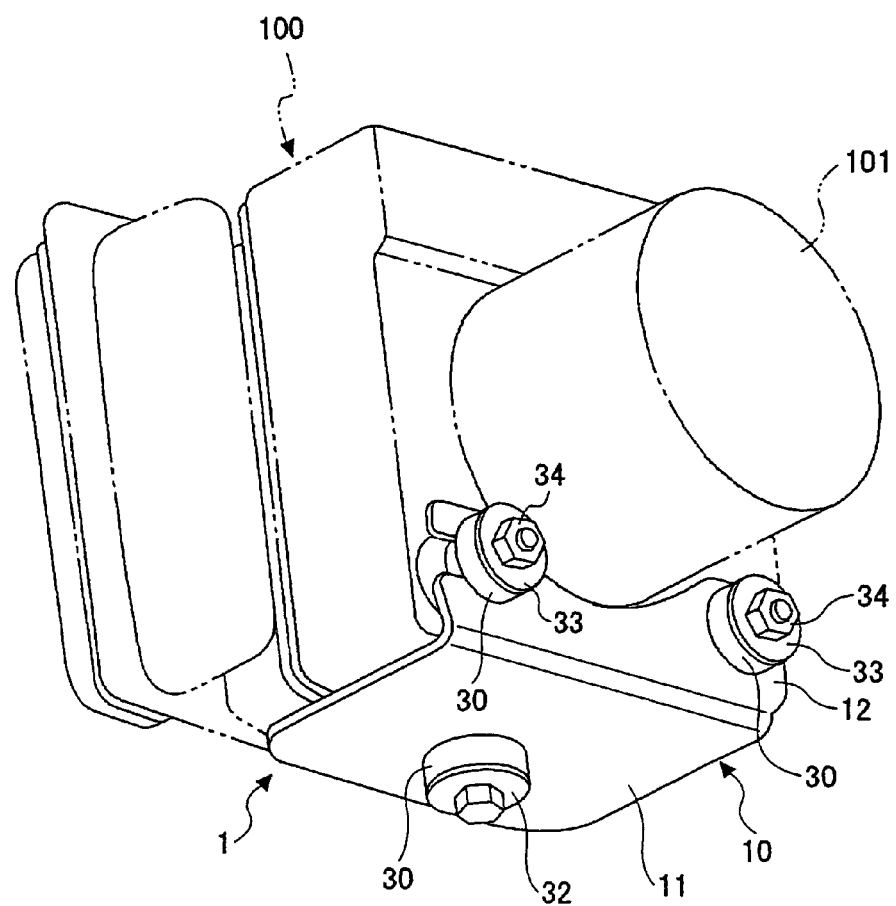
FIG. 2 is a perspective view of an in-vehicle mounted object supported by a supporting device according to the present invention.

FIG. 2 is a perspective view showing a supporting device for supporting an in-vehicle mounted object according to an embodiment of the present invention. Although a fluid-pressure unit (brake actuator) 100 of a vehicle brake apparatus is used as an in-vehicle mounted object in the present embodiment, the in-vehicle mounted object is not limited to the fluid-pressure unit. The supporting device according to the present invention is applicable to various equipments that require measures for damping. As shown in FIG. 2, the supporting apparatus 1 includes a bracket 10, and the fluid-pressure unit 100 as an in-vehicle mounted object is elastically supported by the bracket 10 via a plurality of cushion members (elastic members) 30. The bracket 10 is attached to a vehicle body such as, for example, an engine compartment by using a fastening tool such as a bolt and a nut, and, thereby, the fluid-pressure unit 100 is supported by or mounted to the vehicle body.

Figure 3:
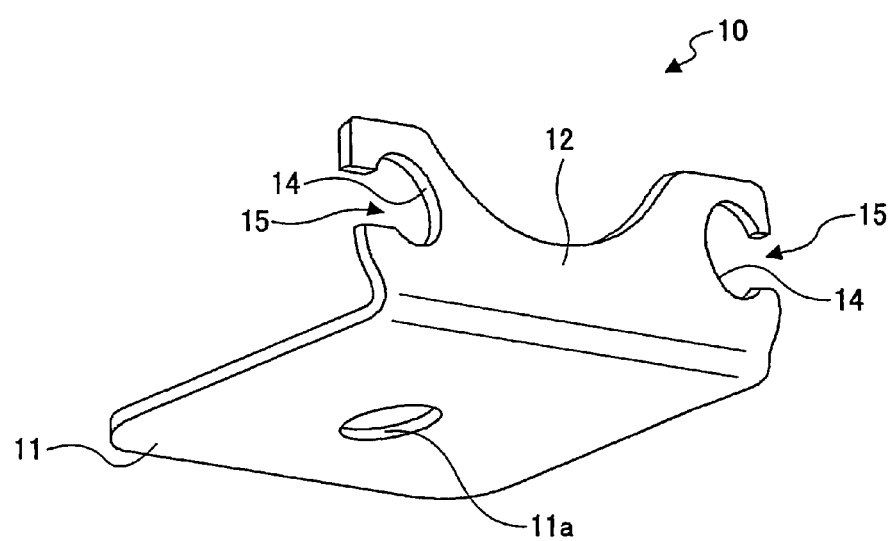
FIG. 3 is a perspective view of a bracket contained in the supporting device shown in FIG. 1.
Figure 4:
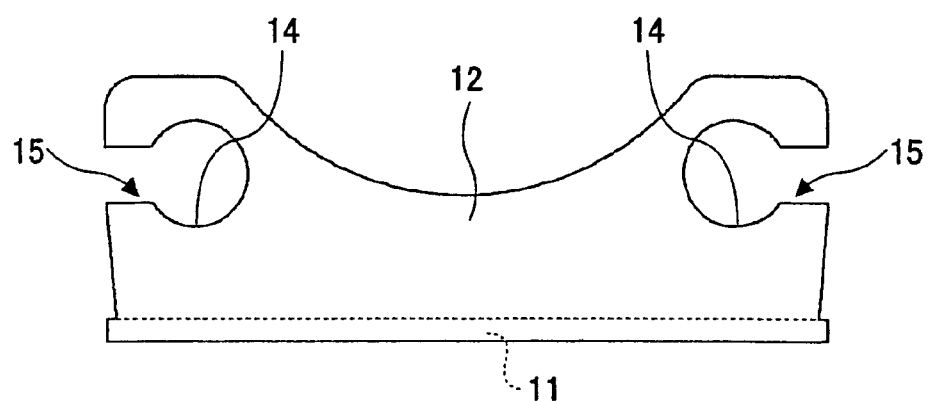
FIG. 4 is a front view of the bracket shown in FIG. 3.
Figure 5:
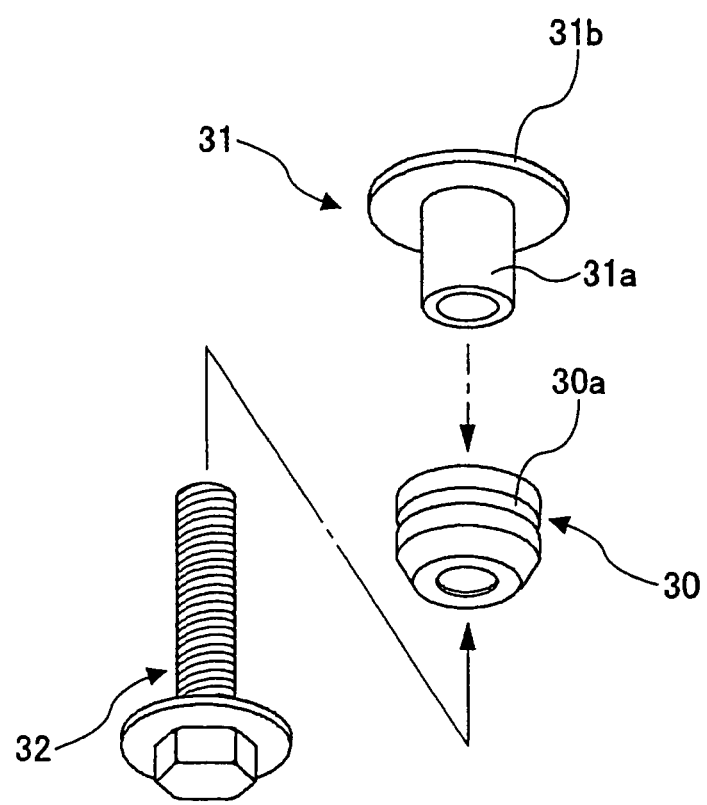
FIG. 5 is a perspective view of a structure for fixing the in-vehicle mounted object to a bottom part of the bracket.

FIG. 3 is a perspective view showing the bracket 10 contained in the supporting device 1. FIG. 4 is a front view of the bracket 10 contained in the supporting device 1. As shown in these figures, the bracket 10 contains a bottom-plate part 11 of a flat plate shape and a side-plate part 12 of a flat plate shape which generally perpendicularly extends from an end of the bottom-plate part 11. A circular opening 11a is formed in the central part of the bottom-plate part 11, and a cushion member 30 is inserted into the circular opening 11a by press-fitting. Additionally, as shown in FIG. 4, two hole parts 14 as opening parts of generally circular shape are formed at a predetermined interval in the side-plate part 12. Further, notches 15 are formed in the side-plate part 12 so as to correspond to the hole parts (opening parts) 14, respectively. Each of the notches 15 is connected to the corresponding one of the hole parts 14 on an inner-end side thereof. Another cushion member 30 is fitted into each of the hole parts 14 through the notch 15. It should be noted that each cushion member 30 is formed with a groove 30a corresponding to the circular opening 11a of the bottom-plate part 11 or the hole part 14 of the side-plate part 12 as shown in FIG. 5.

The fluid-pressure unit 100 that is elastically supported by the above-mentioned bracket 10 has a screw hole (not shown in the figures) at a position corresponding to the circular opening 11a of the bottom-plate part 11. Additionally, stud bolts 102 are protrudingly attached at positions corresponding to the side-plate part 12 of the fluid-pressure unit 100, that is, two positions under a motor housing 101 in the present embodiment.

When attaching the fluid-pressure unit 100 to the bracket 10, the cushion members 30 are inserted into the circular hole 11a of the bottom-plate part 11 and the hole parts 14 of the side-plate part 12, respectively. Then, as shown in FIG. 5, a cylindrical part 31a of a metal made collar 31 is inserted into an opening part of each of the cushion members 30, and a flange part 31b of the collar 31 is brought into contact with an upper end surface of the cushion member 30. Then, a bolt 32 having a washer is inserted into the opening part of the cushion member 30 while the flange part 31b of the collar 31 inserted in the opening part of the cushion member 30 is in contact with the bottom part of the fluid-pressure unit 100. The bolt 32 is engaged with the screw hole of the bottom part of the fluid-pressure unit 100.

Additionally, the cylindrical part 31a of another collar 31 is inserted into an opening part of each of the cushion members 30 which are fitted into the respective hole parts 14 of the side-plate part 12. Stud bolts 102 that are protrudingly attached to the fluid-pressure unit 100 are inserted into the collars 31 of the cushion member 30 that are inserted into the hole parts 14, respectively, and the flange parts 31b of the collars 31 are brought into contact with predetermined portions of the fluid-pressure unit 100. A nut 34 is fastened via a washer 33 at an end of each of the stud bolts 102 which protrudes from each cushion member 30. Accordingly, the fluid-pressure unit 100 is elastically supported by the bracket 10 via three cushion members 30. The bracket 10 is fixed to the vehicle body, which is an object to which the fluid-pressure unit 100 is attached, with the bottom part thereof being positioned generally horizontally.

Figure 1:
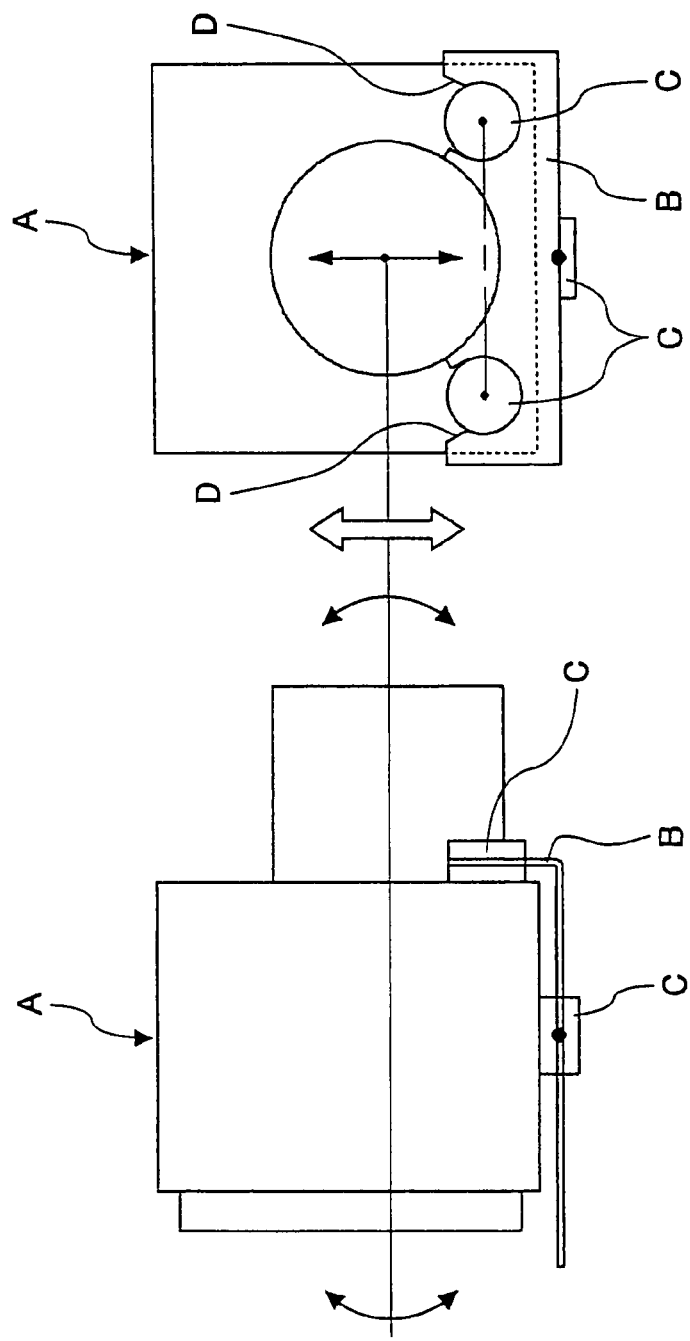
FIG. 1 is an illustration for explaining a vibrating state of an in-vehicle mounted object which is supported by a supporting device.

Now, when the fluid-pressure unit 100 is supported on the vehicle body using the above-mentioned supporting device 1 and when the vehicle is moving, especially when the vehicle is moving on a punishing road, the fluid-pressure unit 100 may vibrate to no small extent in a direction which is perpendicular to a line passing the center points of the two hole parts 14 of the side-plate part 12, that is, in a vertical direction (refer to an outline arrow in FIG. 1) in the present embodiment. If the fluid-pressure unit 100, which is supported on the vehicle body by the support device 1, vibrates in a main vibrating direction, a large force is exerted on the cushion members 30 as elastic members retained in the hole parts 14 in the main vibrating direction, and, thereby, the cushion members 30 tend to be moved in the main vibrating direction. That is, if the fluid-pressure unit 100 vibrates, a largest force is exerted on each of the cushion members 30 in the hole pats 14 of the side-plate part 12 basically in the vertical direction, which is the main vibrating direction, and, thereby, the cushion members 30 tend to be moved mainly in the direction of the force.

Figure 7:
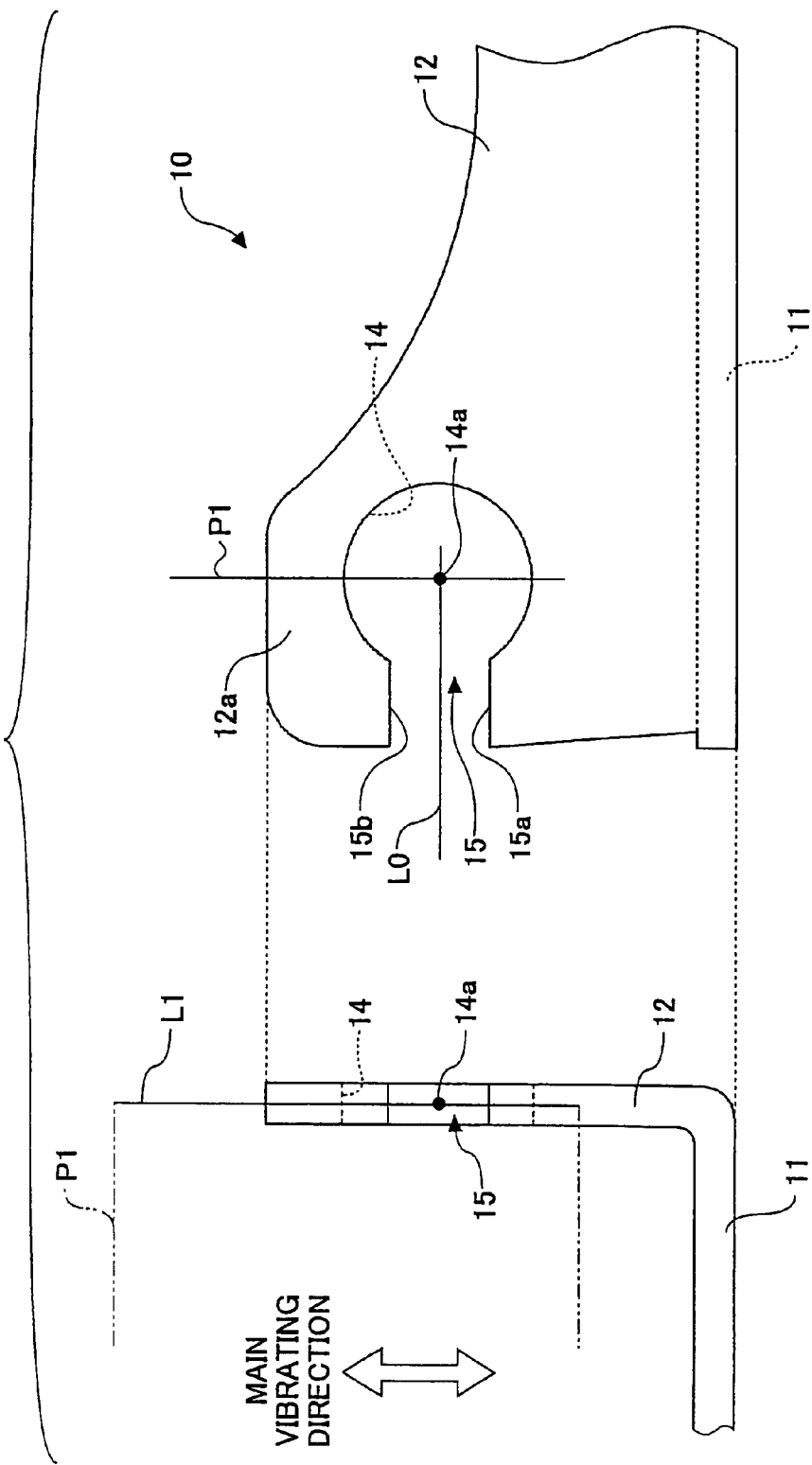
FIG. 7 is an illustration for explaining a part of the bracket shown in FIG. 3.

In view of such a point, in the supporting device 1 according to the present embodiment, the notch 15 is formed in the side-plate part 12 of the bracket 10 so as to be connected to the corresponding hole part 14 in a transverse direction. That is, as shown in FIG. 7, a line L0 between two edge parts 15a and 15b, which define the notch 15 and face each other, extends in a direction perpendicular to the main vibrating direction of the fluid-pressure unit 100, that is, generally parallel to a line passing the center points of the two hole parts 14, and each notch 15 is open outward and abeam from the corresponding hole part 14. Accordingly, each notch 15 does not intersect with a plane P1, which contains a straight line L1 and generally perpendicular to the side-plate part 12, the straight line L1 passing through the center point 14a of the corresponding hole part 14 and extending in the main vibrating direction of the fluid-pressure unit 100. Thus, the side-plate part 12 of the bracket 10 contains a restriction part 12a, which is brought into contact with the cushion member 30, at a position on the line (L1) passing the center point 14a of the hole part 14 and extending parallel to the surface of the side-plate part 12 along the main vibrating direction of the fluid-pressure unit 100, that is, a position determined according to a direction of a largest force applied to the cushion member 30 due to a vibration of the fluid-pressure unit 100.

In the supporting device 1 containing the bracket 10, even if a large force is applied to each of cushion member 30 in the respective one of the hole parts 14 in the main vibrating direction, the cushion member 30 is effectively prevented from moving in the main vibrating direction by the restriction part 12a which is always in contact with the cushion member 30. Thus, since each notch 15 is connected to the corresponding hole part 14 in a transverse direction and does not intersect with the above-mentioned plane P1 in the supporting device 1, each notch 15 does not extend in the main vibrating direction (vertical direction) in which at least a large force is exerted. Accordingly, in the supporting device 1, the cushion members 30 are prevented from being moved due to a vibration from the hole parts 14 to the respective notches 15, and the cushion members 30 are effectively retained within the respective hole parts 14.

Thereby, according to the supporting device 1, transmission of a vibration to the fluid-pressure unit 100 and a vibration of the fluid-pressure unit 100 itself can be effectively suppressed by elastically supporting the fluid-pressure unit 100 as an in-vehicle mounted object. As a result, by using the supporting device 1 according to the present embodiment, a noise problem caused by a vibration of the fluid-pressure unit 100 can be solved and an increase in a stress generated in a brake tube extending from the fluid-pressure unit 100 can be suppressed effectively.

Moreover, the bracket 10 of the above-mentioned supporting device 1 has the bottom-plate part 11 and the side-plate part 12 that are generally perpendicular to each other, and the bottom-plate part 11 is fixed to the bottom part of the fluid-pressure unit 100 via one cushion member 30 in addition to the side-plate part 12 being fixed to the fluid-pressure unit 100 via the two cushion members 30. According to the use of the three-point support structure, the transmission of a vibration between the vehicle body and the fluid-pressure unit 100 as an in-vehicle mounted object can be effectively reduced while reducing a space required for supporting the fluid-pressure unit 100.

Furthermore, in the present embodiment, the collar 31 having the flange 31b is inserted into each cushion member 30 as mentioned above, and the flange part 31b of each collar 31 is brought into contact with the fluid-pressure unit 100. Thereby, even if a recess is formed in a housing of the fluid-pressure unit 100, which is adjacent to the cushion members 30, to define a fluid passage for storing brake oil, for example, seating surfaces of the cushion members can be sufficiently reserved. That is, although in a case where the recess if provided in the housing of the fluid-pressure unit 100, which is adjacent to the cushion members 30, if the cushion members 30 are directly brought into contact with the fluid-pressure unit 100, the cushion members 30 may enter the recess, which causes the elastic supporting state of the fluid-pressure unit 100 to be unstable, the seating surfaces of the cushion members 30 can be sufficiently acquired by the metal made flanges 31b being brought into contact with the fluid-pressure unit 100 so as to stabilize the supporting state of the fluid-pressure unit 100.

Figure 6:
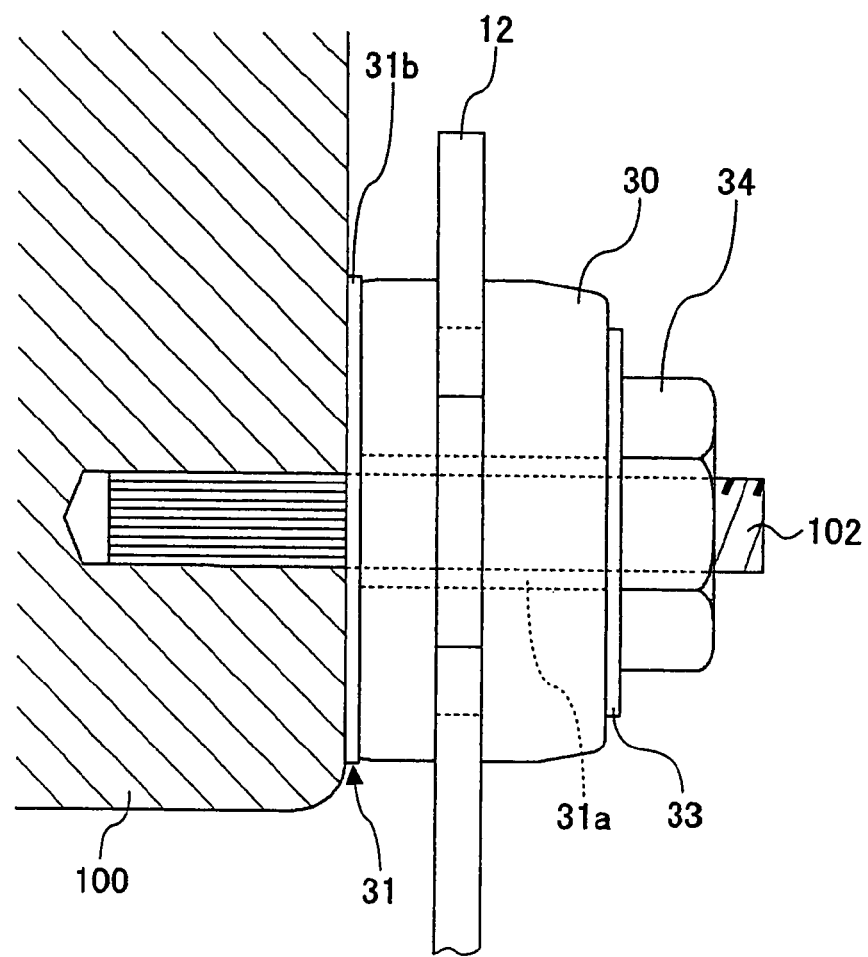
FIG. 6 is a partial cross-sectional view of a structure for fixing the in-vehicle mounted device to a side-plate part of the bracket.
Figure 8:
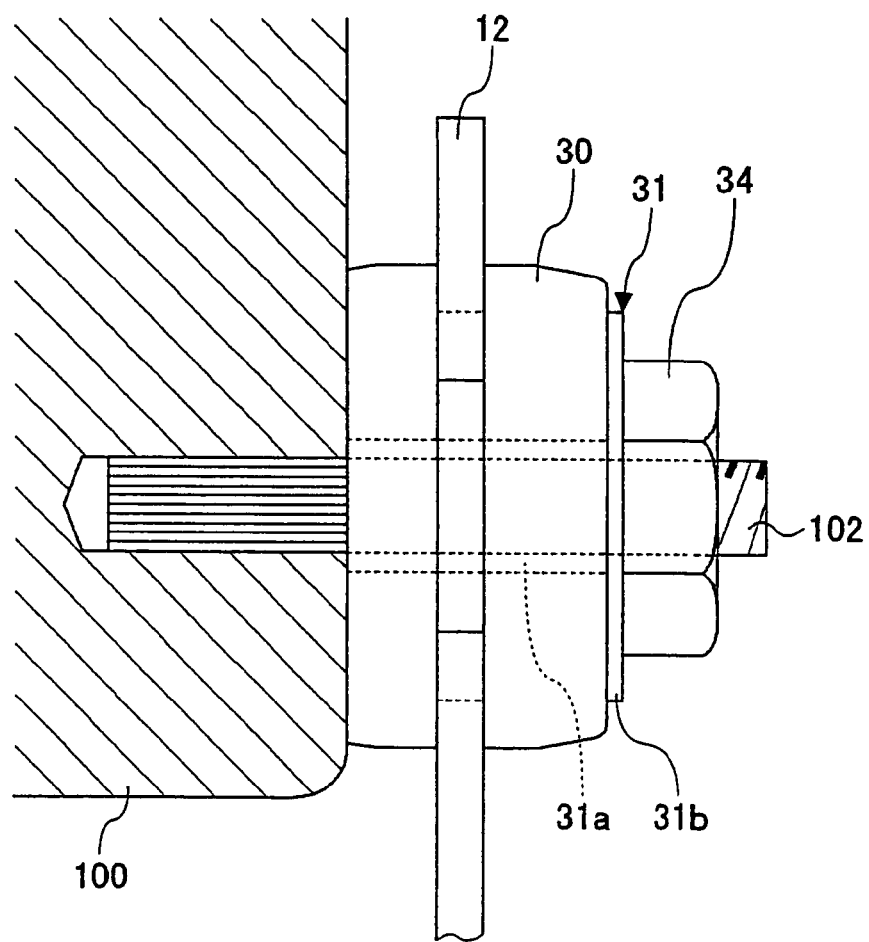
FIG. 8 is a partial cross-sectional view of another example of the structure for fixing the in-vehicle mounted device to a side plate part of the bracket.
Figure 9:
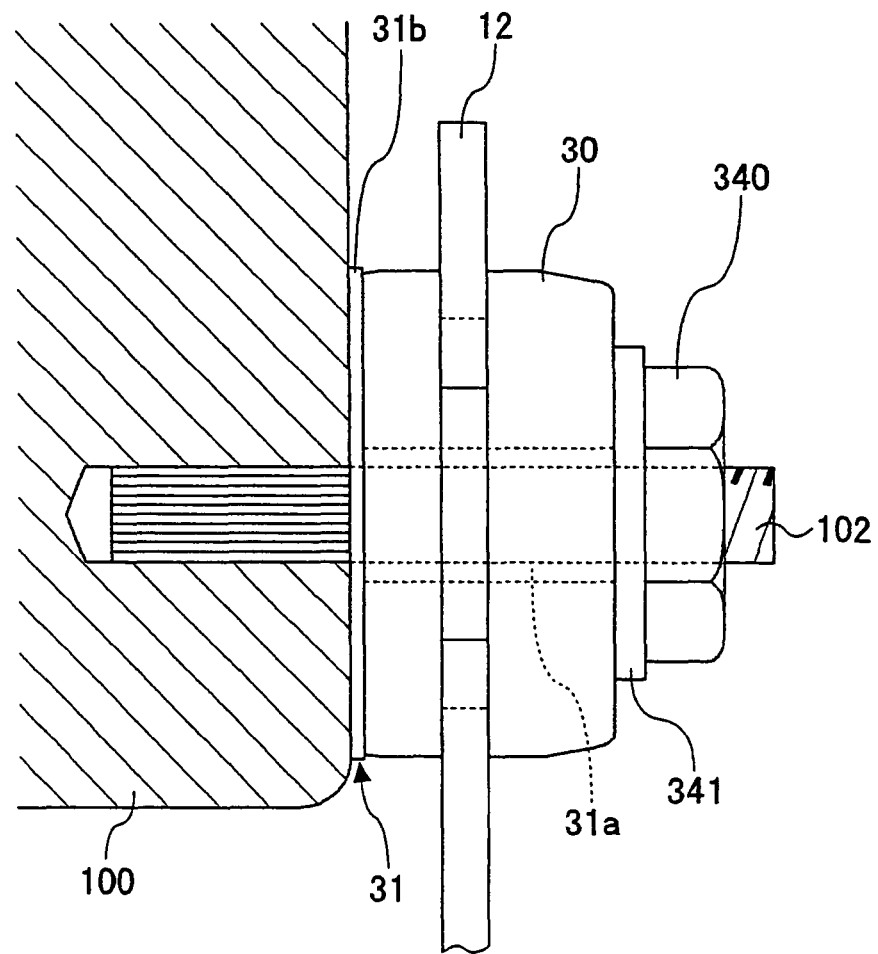
FIG. 9 is a partial cross-sectional view of a further example of the structure for fixing the in-vehicle mounted device to a side plate part of the bracket.

It should be noted that although the cylindrical part 31a of the collar 31 is previously inserted into the opening of the cushion member 30, which is fitted to the hole part 14 of the side-plate part 12 and the flange part 31b of the collar 31 is brought into contact with a predetermined portion of the fluid-pressure unit 100 as shown in FIG. 6 in the above-mentioned example, the present invention is not limited to such a structure. That is, as shown in FIG. 8, the direction of insertion of the collar 31 into the cushion member 30, which is fitted into the hole part 14 may be reversed from that of the example shown in FIG. 6. In such a case, the collar 31 is inserted into the opening of the cushion member 30, which is fitted into the hole part of the side-plate part 12, and after the stud bolt 102 is inserted into the collar 31 so that the flange part 31b is positioned outside the cushion member 30, the nut 34 may be fastened on the end of the stud bolt 102. Thereby, the washer 33 shown in FIG. 6 can be eliminated. Additionally, as a nut to be engaged with the stud bolt 102, a nut 340 with a seat (flange nut) having a seat part (flange part) 341 may be used as shown in FIG. 9 instead of using the nut 34, which is a separate part from the washer 33 as shown in FIG. 6.

Figure 10:
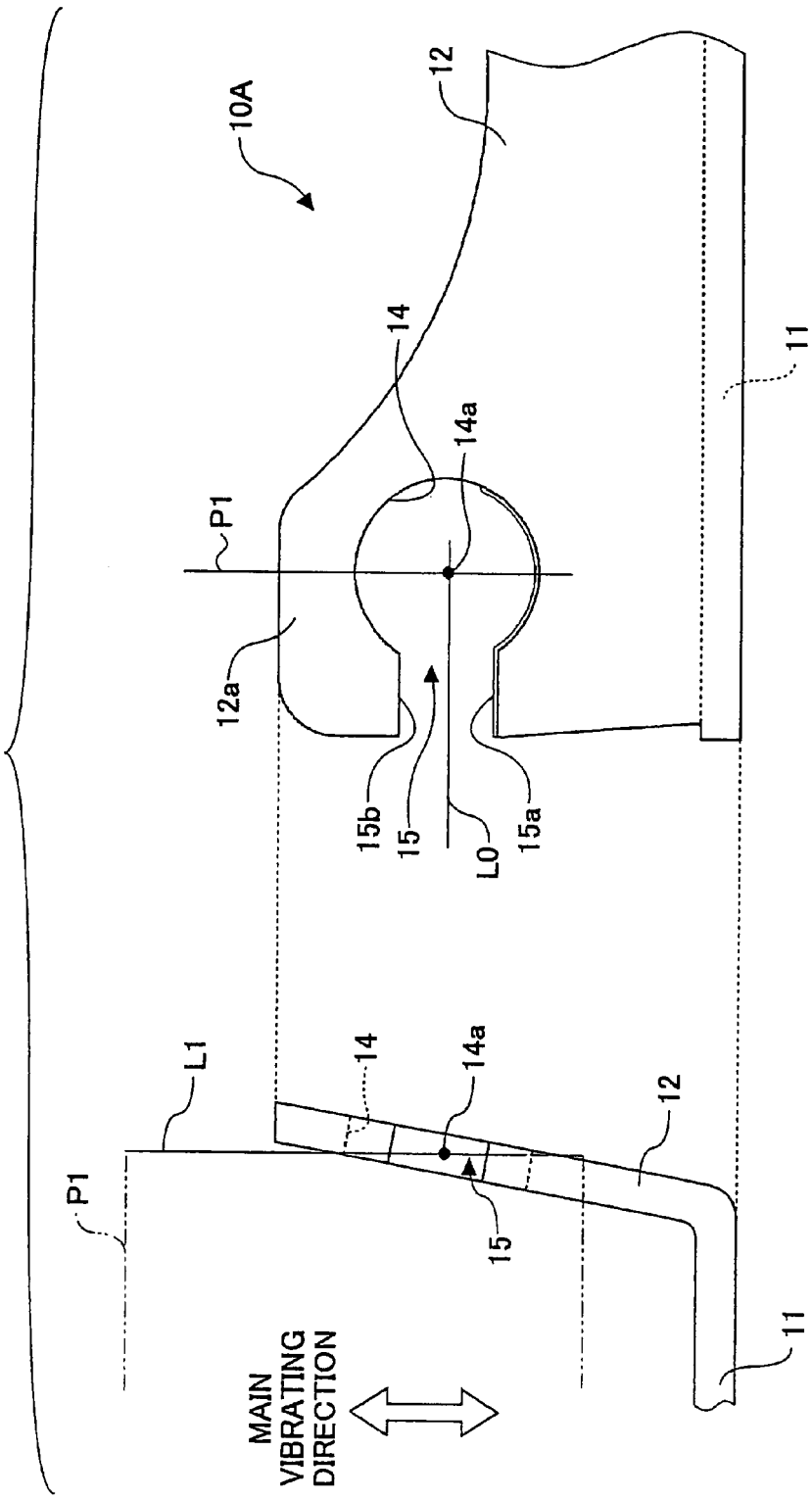
FIG. 10 is an illustration of a part of another example of the bracket applicable to the supporting device according to the present invention.

FIG. 10 is an illustration for explaining another example of the bracket applicable to the above-mentioned supporting device 1. In a bracket 10A shown in FIG. 10, the side-plate part 12 extends obliquely from the bottom-plate part 11. That is, the bracket 10A having the bottom-plate part 11 and the side-plate part 12 that are not perpendicular to each other may be provided to the support device 1. Even when the bracket 10A of such a structure is used, by providing each notch 15 of the side-plate part 12 to contain the line L1, which passes the center point 14a of the corresponding hole part 14 and extends in the main vibrating direction of the fluid-pressure unit 100, and not intersect with the plane P1, which is generally perpendicular to the side-plate part 12, the fluid-pressure unit 100 as an in-vehicle mounted object can be elastically supported effectively so that transmission of a vibration to the fluid-pressure unit 100 is suppressed and also a vibration of the fluid-pressure unit 100 itself is suppressed effectively.

Figure 11:
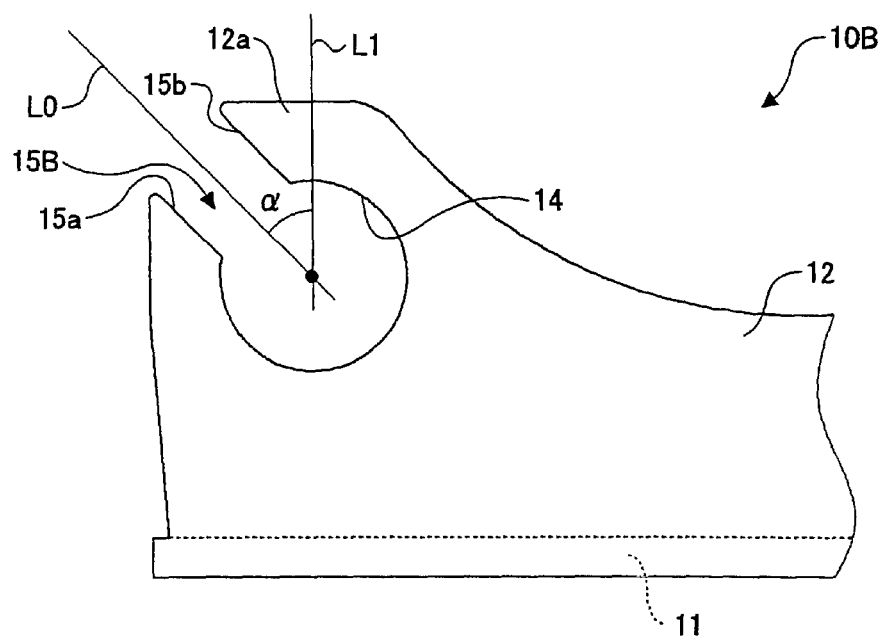
FIG. 11 is an illustration of a part of a further example of the bracket applicable to the supporting device according to the present invention.

FIG. 11 is an illustration for explaining a further example of the bracket applicable to the above-mentioned supporting device 1. In a bracket 10B shown in FIG. 11, each notch 15B does not open outward and abeam from the corresponding hole part 14 unlike the above-mentioned bracket 10, and, instead, it opens outward and obliquely upward from the corresponding hole part 14. That is, each notch 15B of the side-plate part 12 may be one which does not always open abeam if it is provided to contain the line L1, which passes the center point 14a of the corresponding hole part 14 and extends in the main vibrating direction of the fluid-pressure unit 100, and not intersect with the plane P1, which is generally perpendicular to the side-plate part 12. In such a case, an angle formed by the above-mentioned straight line L1 and the center line L0 between the edges 15a and 15b facing each other to form each notch 15B is defined as α, each notch 15B may be formed in the side-plate part 12 so that a relationship $30° \leq \alpha \leq 90°$ or $90° \leq \alpha \leq 150°$ is preferably satisfied and, more preferably, $45° \leq \alpha \leq 90°$ or $90° \leq \alpha \leq 135°$ is satisfied. Even when using such a structure, the fluid-pressure unit 100 as an in-vehicle mounted object can be elastically supported effectively, which effectively suppresses transmission of a vibration to the fluid-pressure unit 100 and also suppressed a vibration of the fluid-pressure unit 100 itself. However, it is most preferable to form the notch 15 to orient abeam by setting the angle α to 90°.

The present invention is not limited to the specifically disclosed embodiments, and variations and modifications may be made without departing from the scope of the present invention.

The present application is based on Japanese priority application No. 2005-118953 filed Apr. 15, 2005, the entire contents of which are hereby incorporated herein by reference.

The invention claimed is:

1. A supporting device for supporting an in-vehicle mounted object on a vehicle body, the supporting device comprising:
   a bracket having a side-plate part having a first opening part; and
   a first elastic member engaged with said first opening part so as to be provided between said bracket and said in-vehicle mounted object,
   wherein said side-plate part includes a first notch having one end connected to said first opening part and the other end open outward; and
   said first notch does not intersect with a plane containing a line passing substantially a center of said first opening part and extending in a main vibrating direction of said in-vehicle mounted object, the plane being substantially perpendicular to said side-plate part,
   wherein said first notch extends from a first side of said side-plate part in a direction substantially perpendicular to said main vibrating direction and connected to said first opening part.

2. The supporting device as claimed in claim 1, wherein said bracket includes a bottom-plate part extending from said side-plate part and fixed to a bottom of said in-vehicle mounted object via an elastic member.

3. The supporting device as claimed in claim 1, wherein said main vibrating direction is substantially coincident with the vertical direction.

4. The supporting device as claimed in claim 1, wherein said side-plate part includes a first restriction part that restricts a movement of said first elastic member at a position determined according to a direction of a maximum force to be applied to said first elastic member due to a vibration of said in-vehicle mounted object.

5. The supporting device as claimed in claim 1, further comprising a second elastic member, and wherein said side-plate part includes a second opening part engaged with said second elastic member and a second notch having one end connected to said second opening part and the other end open outward, and said main vibrating direction is perpendicular to a line passing center points of said first and second opening parts.

6. The supporting device as claimed in claim 5, wherein said second notch extends from a second side of said side-plate part opposite to said first side in the direction substantially perpendicular to said main vibrating direction and connected to said second opening part.

7. The supporting device as claimed in claim 5, wherein said side-plate part includes a second restriction part that restricts a movement of said second elastic member at a position determined according to a direction of a maximum force to be applied to said second elastic member due to a vibration of said in-vehicle mounted object.

8. The supporting device as claimed in claim 5, wherein said first and second elastic members have the same configuration.

* * * * *